Sept. 20, 1932. A. MOORHOUSE 1,878,165
INTERNAL COMBUSTION ENGINE
Filed May 10, 1928 3 Sheets-Sheet 1

Inventor
ALFRED MOORHOUSE
By Miller Titties
Attorney

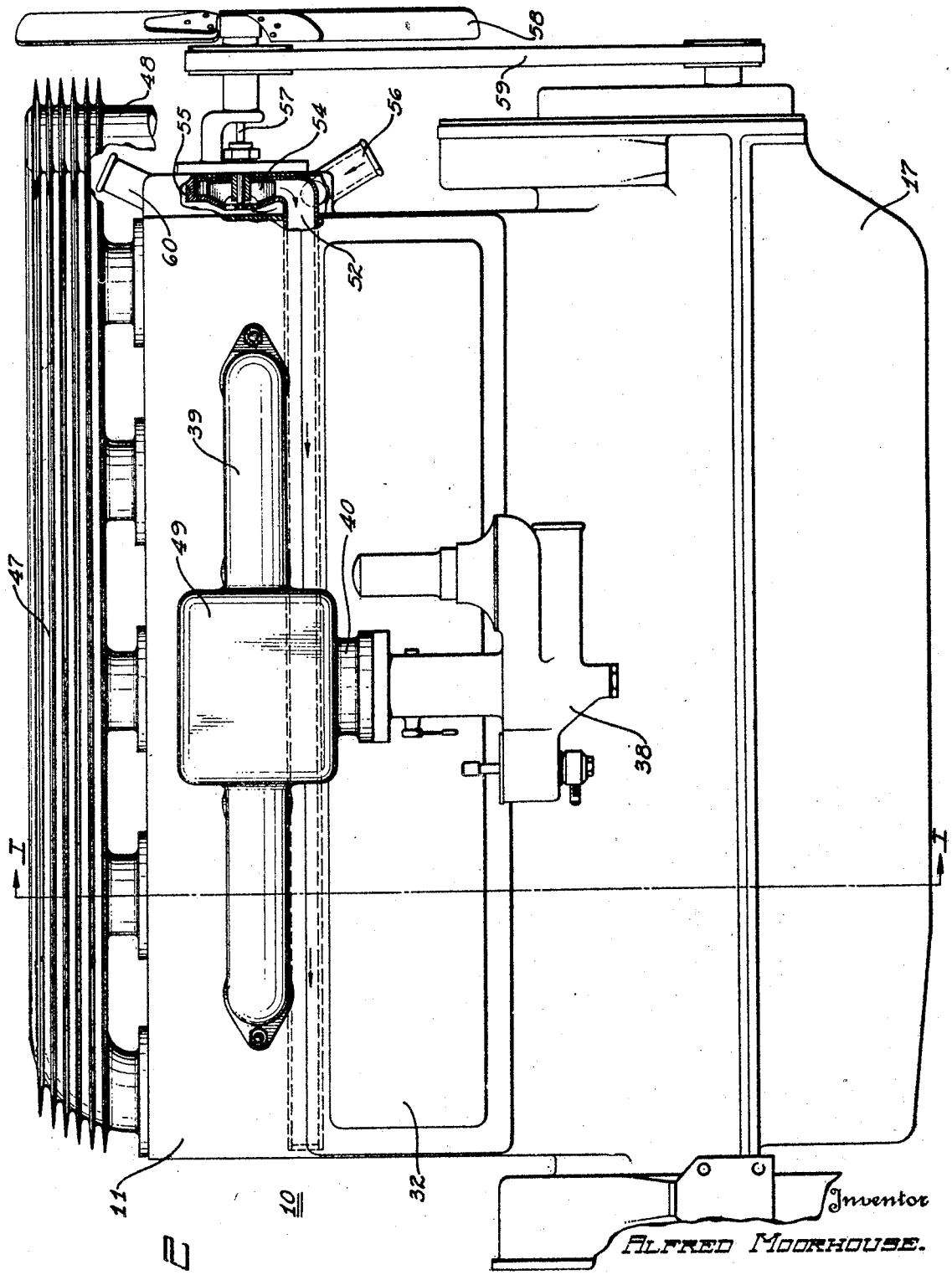

Sept. 20, 1932.   A. MOORHOUSE   1,878,165
INTERNAL COMBUSTION ENGINE
Filed May 10, 1928   3 Sheets-Sheet 3
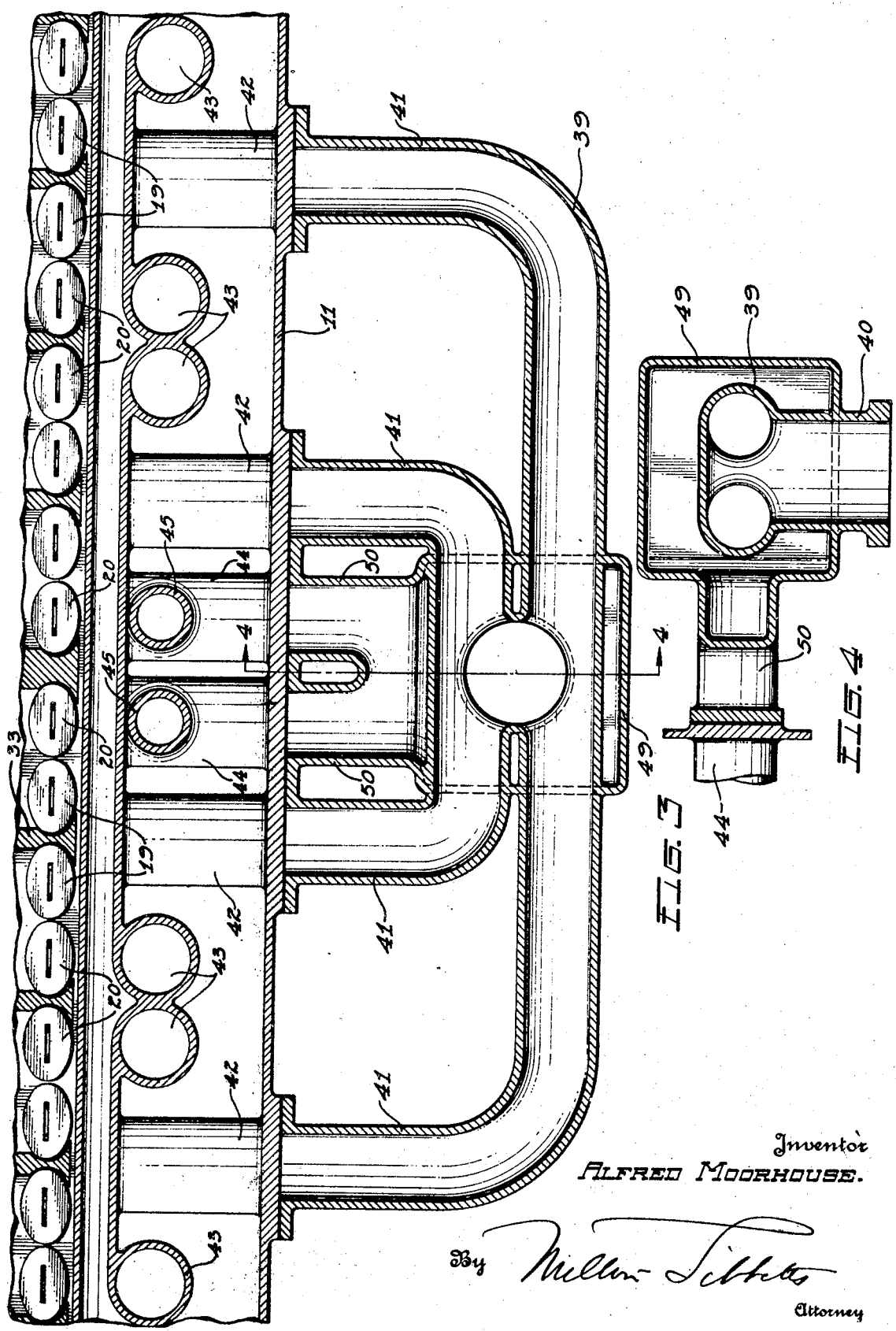

Patented Sept. 20, 1932

1,878,165

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed May 10, 1928. Serial No. 276,563.

This invention relates to internal combustion engines.

One of the objects of the present invention is to increase the volumetric efficiency of an internal combustion engine in which the combustion chamber is concentrated over the valves and a portion only of the cylinder.

Another object of the invention is to increase the area of the opening between the cylinder and the combustion chamber in an internal combustion engine in which the combustion chamber is concentrated over the valves and approximately half of the cylinder, without materially increasing the volume of the combustion chamber.

Another object of the invention is to provide an internal combustion engine in which the explosive mixture is heated before it enters the cylinders of the engine by a circulation of exhaust gases around the intake manifold of the engine.

Another object is to provide an internal combustion engine in which the explosive mixture is heated before it enters the cylinders of the engine by a circulation of exhaust gases alternately in opposite directions around the intake manifold of the engine.

Another object of the invention is to provide means for cooling the exhaust valve seats of an internal combustion engine.

Another object of the invention is to provide means in an internal combustion engine for discharging a stream of cooling fluid against the portions of the engine in which the exhaust valve seats are formed, to cool the seats.

Another object of the invention is to provide a water cooled internal combustion engine having a detachable head in which the head is removable without disconnecting the pipes or conduits connecting the water jackets of the engine to the radiator.

Other objects of the invention will appear from the following description taken in connection with the drawings forming a part of this specification, in which:

Fig. 2 is a side elevation of the engine;

Fig. 3 is a sectional view on line 3—3 of Fig. 1, and

Fig. 4 is a sectional view on line 4—4 of Fig. 3.

Figure 1:
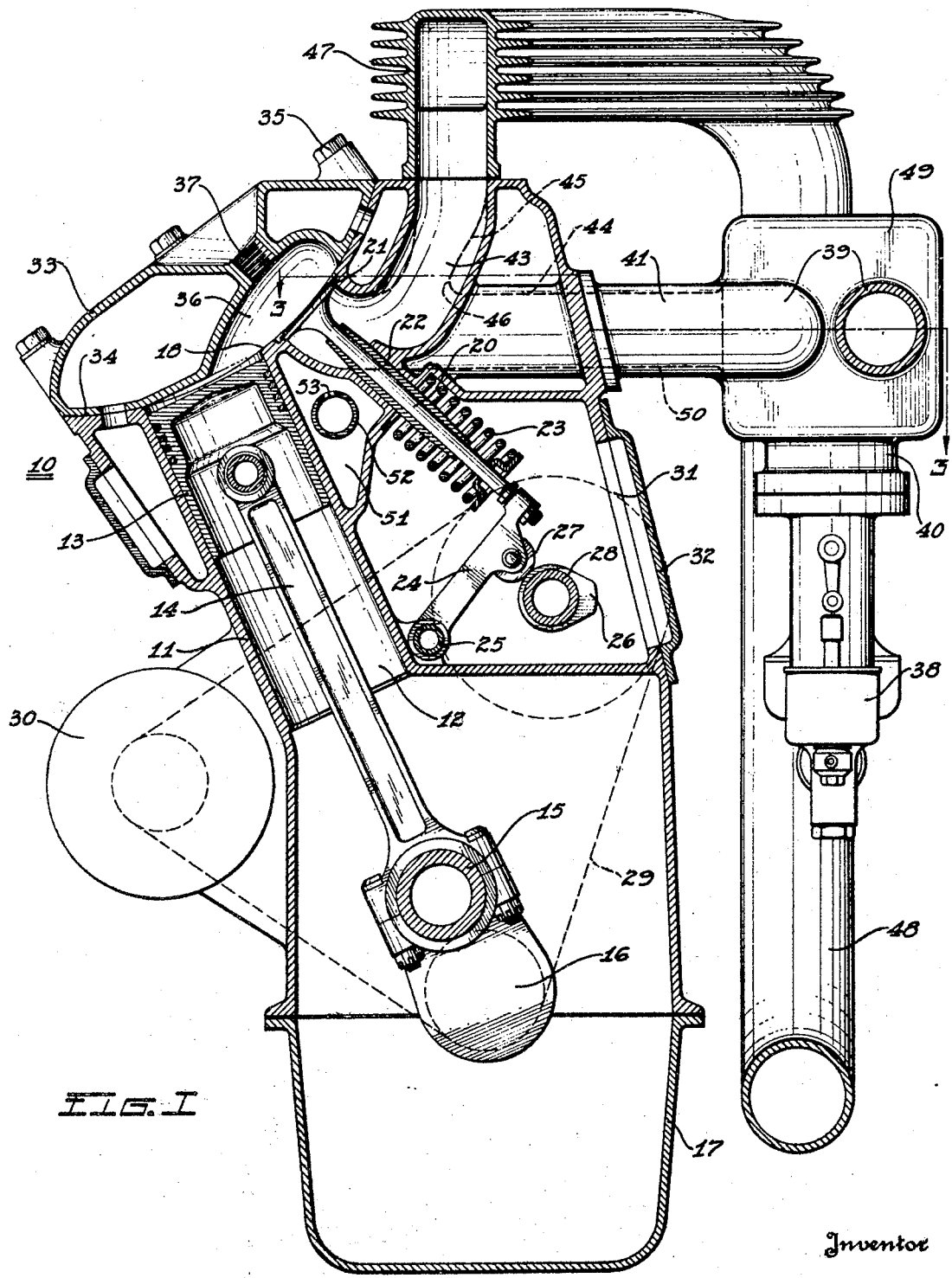
Fig. 1 is a vertical sectional view, taken substantially on line 1—1 of Fig. 2, of an internal combustion engine constructed in accordance with the present invention.

Referring to the drawings, 10 represents generally an eight-cylinder-in-line internal combustion engine constructed in accordance with the present invention. The engine has a cylinder block 11 provided with cylinders 12 having their axes arranged in a plane inclined to the vertical as shown. Each cylinder has a piston 13 movable therein, each piston being connected by means of a connecting rod 14 to a crank 15 of a crank shaft 16 suitably journaled in the lower part of the cylinder block 11. The lower open part of the cylinder block is closed by a crank case 17, removably secured in any suitable manner to the cylinder block.

The portion of the side of the cylinder block adjacent the upper ends of the cylinders 12, in the form shown, is curved to provide a concave cylinder head seat 18. Each cylinder is provided with an inlet valve 19 and an exhaust valve 20 arranged at one side of the cylinder as in conventional L-head internal combustion engine construction and seated in seats formed in the cylinder block, the exhaust valve seats being indicated at 21. In accordance with the present invention, however, and because of the curvature of the cylinder heat seat, the valves are arranged with the axes of their stems at an angle to the cylinder axis, as clearly shown in Fig. 1, the plane of the heads of the valves preferably being approximately tangent to the cylinder head seat at the center of the valve heads. The stems of the valves 19 and 20 are mounted in and guided by valve stem guides 22 supported in the cylinder block. Each valve is yieldingly pressed to closed position by a suitable spring 23 and is adapted to be opened by means of a rocker arm 24, pivotally mounted as at 25 to the cylinder block and actuated by a cam 26 adapted to engage a roller 27 carried by the rocker arm. The cams 26 are carried by a cam shaft 28 adapted to be driven by the crank shaft preferably through a chain 29 running over gears mounted on the crank and cam shafts, as shown diagrammatically in Fig. 1. A generator 30 shown diagrammatically in Fig. 1 is also driven by the chain 29. A suitable opening 31, closed by a cover 32, is provided in the cylinder block 11 opposite the rocker arms 24 permitting ready access to the valve adjustments provided.

A cylinder head 33 having a convex surface 34 adapted to cooperate with the concave cylinder head seat 18, is removably secured in position on the cylinder block 11 by means of bolts 35. The cylinder head is provided with a combustion chamber 36 for each of the cylinders of the engine, each combustion chamber being concentrated over the valves 19 and 20 and approximately one-half of the cylinder, as shown in Fig. 1. A threaded opening 37 is provided in the cylinder head, preferably over the inlet valve of each cylinder, to receive a spark plug, not shown.

With this arrangement of engine elements, particularly advantageous in engines of relatively small bore, it will be apparent that the area of the opening between the cylinder and the combustion chamber is larger than in an engine of the same bore, and the same shape and volume of combustion chamber but employing a flat or plane cylinder head seat. It will be clear that this increased area of opening will increase the volumetric efficiency of the engine without diminishing substantially the desirable results obtained from the agitation of the mixture in the combustion chamber.

In the form shown, explosive mixture is supplied to the cylinders from a carburetor 38 mounted on an intake manifold 39 comprising a vertically extending portion 40 and two horizontally arranged U-shaped portions having arms 41 adapted to communicate with intake passages 42 extending from the side of the cylinder block 11 and communicating with the intake ports of each cylinder. Registering with the exhaust port of each cylinder, except cylinders 4 and 5, is a curved exhaust passage 43 extending to the top of the cylinder block 11 as shown, and of substantially the cross-sectional area of the exhaust port throughout its length. For each of cylinders 4 and 5, however, an exhaust passage 44 registering with the exhaust port, extends to the side of the cylinder block 11 as shown, and communicating with each of these passages 44 is another passage 45, extending from the passage 44 to the top of the cylinder block with its opening at the top of the block in line with the corresponding openings of passages 43. Each of the passages 45 is preferably provided with a restricted portion 46 to reduce the cross-sectional area of the passage 45, at the end communicating with passage 44, to approximately one-half the area of the exhaust passages 43. Mounted on the top of the cylinder block 11 and having openings registering with each of the exhaust passages 43 and 45 is an exhaust manifold 47 which is connected to an exhaust pipe 48, through which the exhaust gases from the engine are conducted to a suitable muffler, not shown, and thence to the atmosphere. An exhaust conduit 49 having a pair of preferably parallel arms 50 is attached to the side of cylinder block 11 with the arms 50 registering with the exhaust passages 44. This conduit, as shown, completely encloses the intake manifold in the zone of the joint between the vertically and horizontally extending portions thereof, thus forming a passage for the exhaust gases from one of the exhaust passages 44 around the manifold and back to the other exhaust passage 44.

During operation of the engine, the exhaust gases expelled from cylinder 4 for example, will be divided, a portion only of the gases entering exhaust passage 45 through restricted opening 46, the remainder of the gases being forced into the arm 50 of conduit 49 communicating with exhaust passage 44 of cylinder 4. The gases will then be forced through conduit 49 around the vertically and horizontally extending portions of the intake manifold 39 enclosed in the conduit and into the other arm 50, the exhaust passage 44 of cylinder 5, through restricted opening 46, into passage 45 associated with cylinder 5 and into the exhaust manifold 47. And conversely, exhaust gases expelled from cylinder 5 will be divided, the portion not entering the exhaust manifold being forced around the intake manifold through conduit 49 into exhaust passage 44, through restricted opening 46 into exhaust passage 45 associated with cylinder 4, and into the exhaust manifold. The exhaust gases expelled from cylinders 4 and 5 are thus circulated around the intake manifold alternately in opposite directions to heat the explosive mixture flowing through the intake manifold to the engine cylinders.

The engine is preferably cooled by water, the cylinder block and cylinder head being provided with suitable water jackets, as shown. One of the water jackets 51 in the cylinder block is located between the cylinders and the valves, and in the upper wall of this jacket, the inlet and exhaust valve seats are formed as may be seen in Fig. 1. Positioned in this jacket 51 and extending the length of the engine, is a water pipe or conduit 52, preferably closed at one end and having apertures 53 opposite each exhaust valve facing the portion of the water jacket in which the valve seats are formed, the end of the conduit 52, opposite the closed end, being connected preferably to a suitable water pump, such as the centrifugal pump 54 shown. The pump 54 is mounted in a chamber 55 in the cylinder block 11 and water is supplied to this chamber through a water jacket inlet pipe 56 from the engine radiator, not shown. Pump 54 is adapted to be driven by the fan shaft 57 which carries the cooling fan 58, the fan, fan shaft and pump being driven by the crank shaft through a suitable belt 59. During operation of the engine, water entering the chamber 55 through pipe 56 from the radiator, is drawn into pump 54 and forced thereby into conduit 52, whence it is discharged through apertures 53 against the jacket wall in which the exhaust valve seats are formed. In this way the exhaust valve seats, during operation of the engine, are kept relatively very cool, as a result of which, exhaust valve troubles are minimized.

The water discharged from conduit 52 will circulate around the cylinder water jackets and as it becomes heated, will rise through the jackets in the cylinder block and cylinder head to the top of the cylinder block and through water jacket outlet pipe 60 on the cylinder block to the engine radiator, where it will be cooled. From the radiator the water will be drawn again into pump 54 and forced therefrom into conduit 52 from which it is again discharged against the wall of the water jacket. With this arrangement, it will be apparent that, while the water circulates through the jackets in the cylinder head, the water jacket outlet pipe is not connected to the head and consequently the head may be removed from the cylinder block without disconnecting the water jacket outlet pipe.

In the form of the invention shown, with the cylinder block extending to the top of the engine, the water pump may be mounted immediately adjacent the top of the engine, which permits the cooling fan, where the fan shafts drives the pump, to be mounted higher with respect to the engine than has heretofore been possible. The increased cooling resulting from this higher location of the fan with respect to the engine radiator will be evident.

The form of the invention shown and described is to be considered as a preferred form only, and it will be understood that the invention is not to be limited except by the scope of the appended claims.

Having thus described the invention, what is claimed and desired to be secured by Letters Patent is:

1. In an internal combustion engine, in combination, a cylinder block, and a detachable head for the cylinder block, the cooperating surfaces of the cylinder block and head being curved.

2. In an internal combustion engine, in combination, a cylinder block, a cylinder in the block, valves arranged at one side of the cylinder, the cylinder block having a curved head seat, and a detachable head for the cylinder block having a combustion chamber concentrated over the valve and a part only of the cylinder.

3. In an internal combustion engine, in combination, a cylinder block, a cylinder in the block, valves arranged at one side of the cylinder with the axes of the valve stems at an angle to the cylinder axis, the cylinder block having a curved head seat, and a detachable head for the cylinder block having a combustion chamber concentrated over the valves and a part only of the cylinder.

4. In an internal combustion engine, in combination, a cylinder block, a cylinder in the block having its axis inclined to the vertical, valves arranged at one side of the cylinder with the axes of the valve stems at an angle to the cylinder axis, the cylinder block having a concave head seat, and a detachable head for the cylinder block having a combustion chamber concentrated over the valves and a part only of the cylinder.

5. In a multi-cylinder internal combustion engine, in combination, a cylinder block, a plurality of cylinders in the block, an exhaust valve for each cylinder having a seat in the block, a water jacket between the cylinders and the valves, a conduit in the water jacket having an aperture facing the portion of the block in which each exhaust valve seat is formed, and a pump connected to the conduit for forcing water through the conduit and against the portions of the block in which the valve seats are formed.

6. In an internal combustion engine, a cylinder block having a concave cylinder head seat, and a head secured against the cylinder block seat, said head having a curved wall fitting the concave cylinder head seat.

7. In an internal combustion engine, a cylinder block having a concave cylinder head seat, and a head secured to the cylinder head seat, said head having a convex wall conforming to the concave cylinder head seat.

8. In an internal combustion engine, in combination, a cylinder block, a cylinder in the block having its axis inclined to the vertical, valves arranged at one side of the cylinder with the axes of the valve stems at an angle to the cylinder axis, the cylinder block having a concave head seat, and a detachable head for the cylinder block having a convex wall opposite the concave seat of the cylinder block, said head and block seat providing a combustion chamber concentrated over the valves and a part only of the cylinder.

9. In an internal combustion engine, in combination, a cylinder block, and a detachable head for the cylinder block, the cooperating surfaces of the cylinder block and head being bent out of line.

10. In an internal combustion engine, in combination, a cylinder block having a diagonally arranged seat bent in cross section, and a detachable cylinder head conforming and secured to said seat.

11. In an internal combustion engine, the combination of a cylinder block and a detachable head for the cylinder block, the meeting surfaces between said block and head being bent in cross section and no parts of the block or head extending across said surfaces or continuations thereof.

12. In an internal combustion engine, the combination of a cylinder block having a cylinder and a valve port, the axis of the cylinder and the axis of the valve port being arranged at an angle to each other, a detachable head for the cylinder block, said head extending over the cylinder and port, the meeting surfaces between the cylinder block and the head being depressed from one side of the head to the other.

13. In an internal combustion engine, the combination of a cylinder block having a cylinder and a valve port, the axis of the cylinder and the axis of the valve port being arranged at an angle to each other, a detachable head for the cylinder block, said head extending over the cylinder and port, the meeting surfaces between the cylinder block and the head being curved inwardly between the sides of the head.

14. In an internal combustion engine, the combination of a cylinder block having a cylinder and a valve port, the axis of the cylinder and the axis of the valve port being arranged at an angle to each other, a detachable head for the cylinder block, said head extending over the cylinder and port, the meeting surfaces between the cylinder block and the head being bent inwardly between the sides of the head.

15. In an internal combustion engine, the combination of a cylinder block having a cylinder and a valve port arranged adjacent each other, a piston in the cylinder, a poppet valve to close the port, the arrangement of cylinder and valve port being such that a plane normal to the axis of the piston is at an angle to a plane normal to the axis of the valve, and a detachable head for the cylinder block, the meeting surfaces of the head and cylinder block having respective portions substantially in line with said planes.

16. In an internal combustion engine, the combination of a cylinder block having a cylinder and a valve port arranged adjacent each other, a piston in the cylinder, a poppet valve to close the port, a detachable head for the cylinder block, the meeting surfaces between the cylinder block and the head being curved and being substantially normal to the axes of both said piston and valve.

17. In an internal combustion engine, the combination of a cylinder block having a concave cylinder head seat, and a head conforming to and secured against said cylinder head seat, said head having practically the entire combustion chamber of the engine formed therein and communicating with the cylinder.

18. In an internal combustion engine, the combination of a cylinder block having a cylinder and a valve port, the axis of the cylinder and the axis of the port being arranged at an angle to each other, and a detachable head for the cylinder block, said head including a water jacket and extending over the cylinder and port, a portion of the head and jacket over the cylinder being extended inwardly between the sides of the head.

In testimony whereof I affix my signature.

ALFRED MOORHOUSE.

CERTIFICATE OF CORRECTION.

Patent No. 1,878,165.  September 20, 1932.

ALFRED MOORHOUSE.

It is hereby certified that error appears in the printed specification of the above numbered patent requiring correction as follows: Page 1, line 83, for "heat" read "head"; page 3, line 66, claim 2, for "valve" read "valves"; and that the said Letters Patent should be read with these corrections therein that the same may conform to the record of the case in the Patent Office.

Signed and sealed this 28th day of February, A. D. 1933.

(Seal)

M. J. Moore,
Acting Commissioner of Patents.